C. F. MELLOR & A. G. HANSON.
CHECK PROTECTOR.
APPLICATION FILED MAY 8, 1916.

1,261,587.

Patented Apr. 2, 1918.
4 SHEETS—SHEET 1.

INVENTORS
C. F. MELLOR
A. G. HANSON

ATT'Y.

C. F. MELLOR & A. G. HANSON.
CHECK PROTECTOR.
APPLICATION FILED MAY 8, 1916.
1,261,587.
Patented Apr. 2, 1918.
4 SHEETS—SHEET 3.
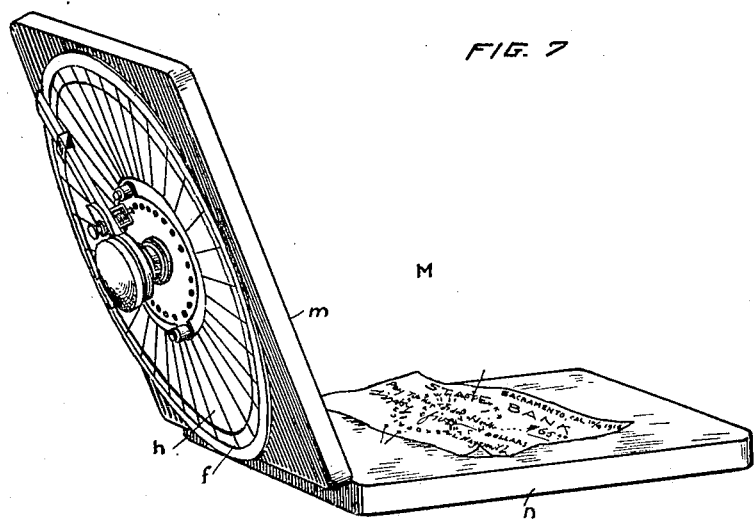
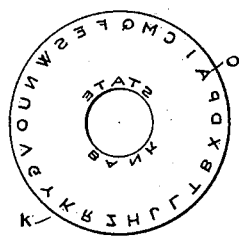
FIG 8
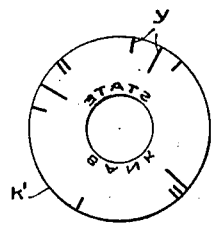
FIG. 9
FIG. 10
INVENTORS
C. F. MELLOR
A. G. HANSON
BY J. M. Wright
ATT'Y.

C. F. MELLOR & A. G. HANSON.
CHECK PROTECTOR.
APPLICATION FILED MAY 8, 1916.

1,261,587.

Patented Apr. 2, 1918.
4 SHEETS—SHEET 4.

INVENTORS
C. F. MELLOR
A. G. HANSON
BY J. M. Wright,
ATT'Y.

UNITED STATES PATENT OFFICE.

CHARLES F. MELLOR AND ALLEN G. HANSON, OF REPRESA, CALIFORNIA.

CHECK-PROTECTOR.

1,261,587.  Specification of Letters Patent.  Patented Apr. 2, 1918.

Application filed May 8, 1916. Serial No. 96,262.

*To all whom it may concern:*

Be it known that we, CHARLES F. MELLOR and ALLEN G. HANSON, a subject of the King of Great Britain and a citizen of the United States, respectively, residing at Represa, in the county of Sacramento and State of California, have invented new and useful Improvements in Check-Protectors, of which the following is a specification.

The object of the present invention is to provide a device for protecting against the use of fraudulent and spurious bank checks, drafts and other negotiable paper.

Figure 1:
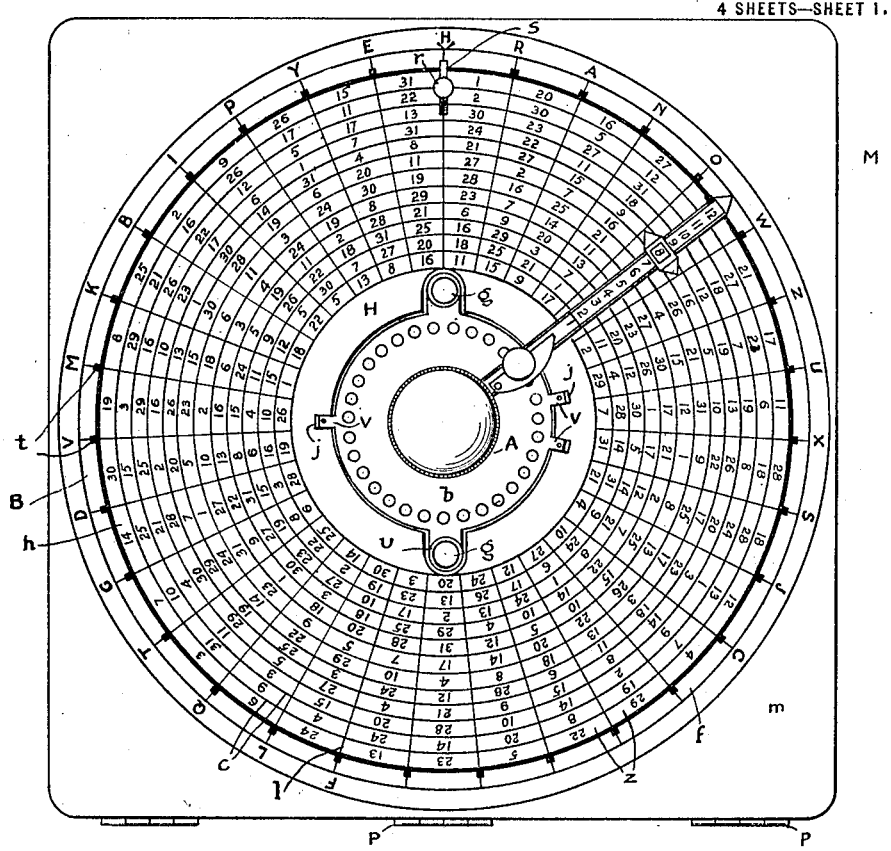
Figure 2:
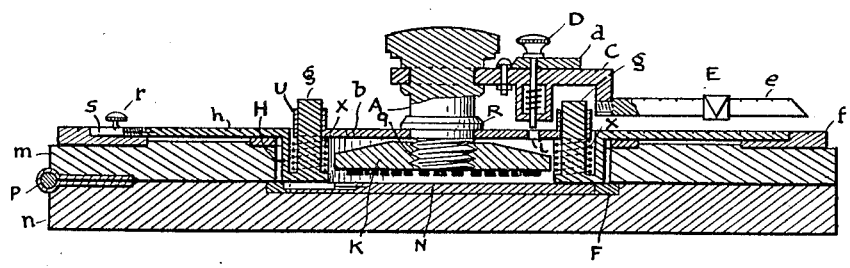
Figure 3:
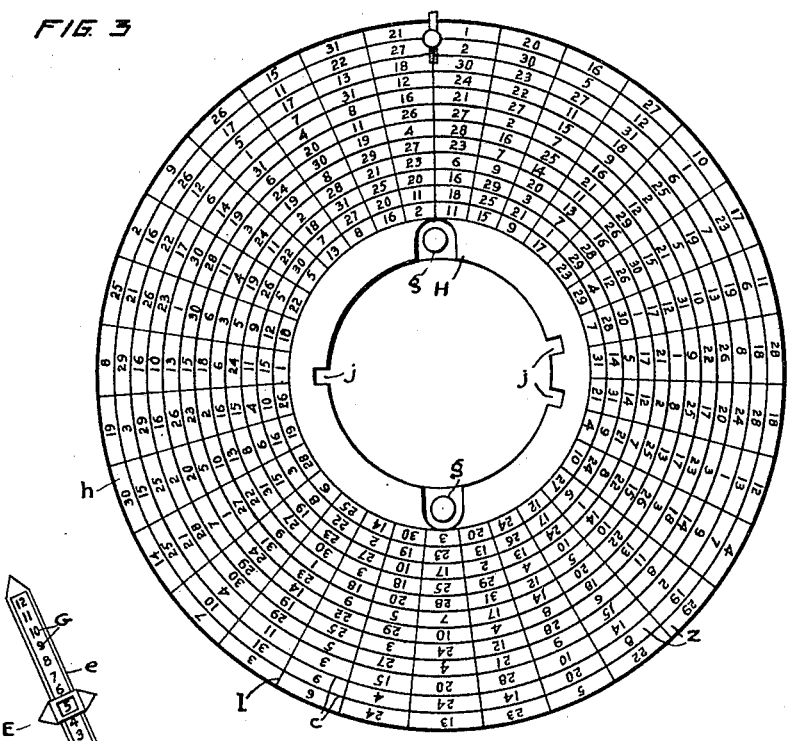
Figure 4:
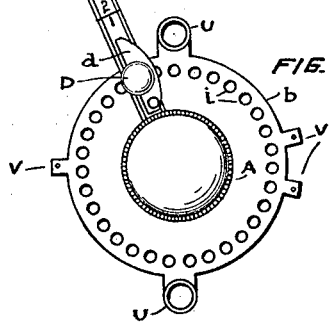
Figure 5:
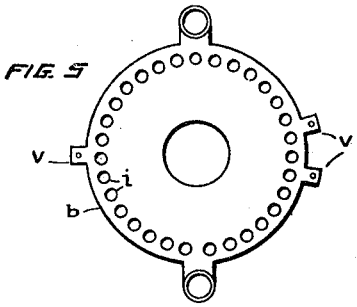
Figure 6:
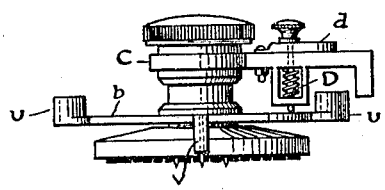
Figure 11:
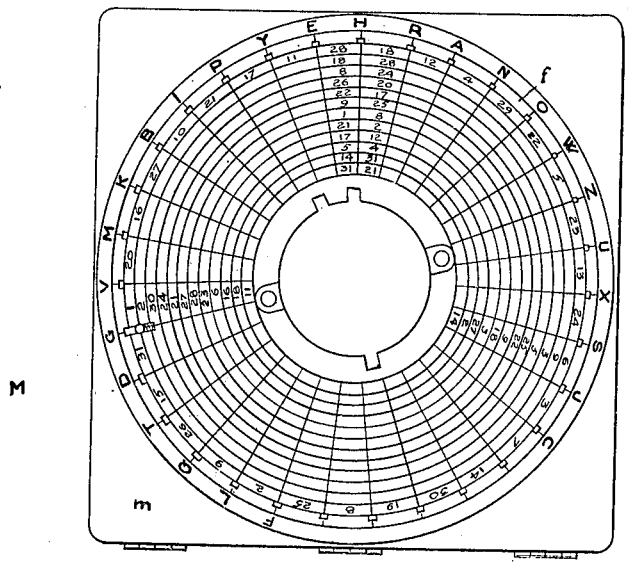
Figure 12:
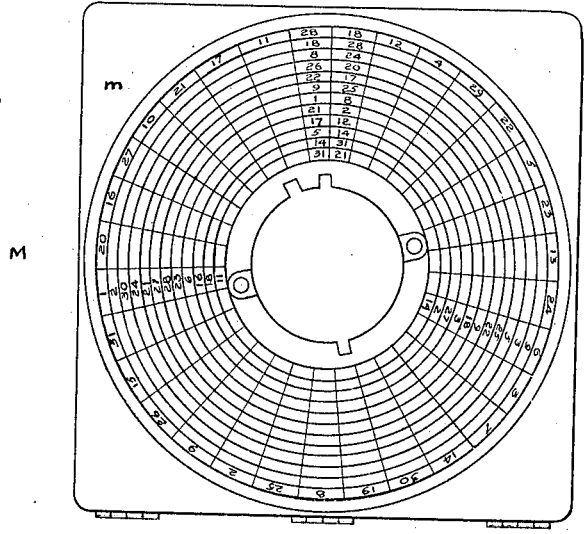
Figure 13:
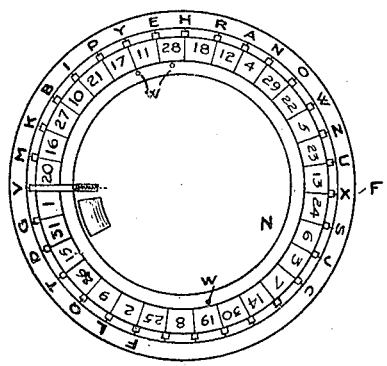

In the accompanying drawings, Figure 1 is a plan view of the improved device; Fig. 2 is a vertical section thereof transverse to a line of hinges; Fig. 3 is a plan view of an inner dial attached; Fig. 4 is a similar view of a central portion of the device detached; Fig. 5 is a similar view of a perforated plate detached; Fig. 6 is a side view of the portion shown in Fig. 4, certain parts being omitted; Fig. 7 is a perspective view of a key form of the device in the open position, showing also a check, stamped and counter-stamped, lying on the inner or upper face of a lower part of the device; Fig. 8 is a bottom plan view of a stamp used in the key form of the device; Fig. 9 is a similar view of a stamp used in individual form of the device; Fig. 10 is a view showing impressions made by the two stamps together, as they would appear when stamped upon a check; Fig. 11 is a plan view of the key form of the device, showing the dial thereof when set to a certain position; Fig. 12 is a similar view of the individual form of the device in the same operative position as that shown in Fig. 11; Fig. 13 is a plan view of a small dial on the lower part of the key device when set in the same operative position as in Figs. 11 and 12.

On referring to the drawings, it will be seen that a key device or machine M comprises an upper wooden part $m$, (Figs. 1, 2 and 7) hinged, as shown at $p$, to a lower part $n$, so that the upper part can be raised or lowered upon the lower part. To the upper part $m$ is immovably secured an outer metallic dial or index plate $f$, which is divided into thirty-one equal divisions $d$, twenty-six of which are marked with the letters of the alphabet in irregular order. The outer dial plate $f$ is formed in its inner edge with grooves $t$, one at each division $d$. $h$ indicates an inner rotary metallic dial plate, best shown in Fig. 3, which is divided by radial lines $l$ into thirty-one equal parts adapted to register with the thirty-one divisions of the outer dial plate $f$. It is also subdivided by concentric lines $c$ into twelve annular portions $z$, which correspond with the months of the year, the numbers of the days of the month being marked in an irregular manner in the several radially extending divisions in each annular portion $z$. The dial plate $h$ rotates freely around a central portion A, hereinafter described, and can be secured in any desired position by means of a small slidable catch $s$, having a knob $r$ and which can engage any one of the grooves $t$ in the fixed dial plate $f$. The dial plate $h$ is formed with a depressed annular central portion H (Fig. 2) upon which are erected small round diametrically opposite standards $g$ fitted with springs $x$.

Supported upon said springs $x$ is an annular perforated plate $b$ (Fig. 5) having two horizontally projecting diametrically opposite apertured guides $u$, through which extend standards $g$ on the central portion of the inner dial plate $h$. Said perforated plate $b$ is formed with three small lugs $v$ which extend outwardly from the plate and fit within correspondingly formed grooves $j$ in the inner edge of the inner dial plate $h$, so that the plate $b$ revolves with the inner dial $h$, being independent of the central portion A and the parts secured thereto. The central portion A extends through the central hole in the dial plate $b$, and has a flange R by which it is supported on the plate $b$. Screwed thereon, as shown at $q$, is a stamp $k$, which may be made of metal, rubber, or any other suitable material. The central portion A has a knob $a$ for convenience in turning the same, and secured to the central portion A is a radiating arm $c$ carrying a spring-actuated bolt D which can enter any one of a circular series of holes $i$ in the plate $b$, being normally held out of engagement with the plate $b$ by a pivoted catch $d$. Said radiating arm $c$ carries a radiating finger $e$, on which, and on the arm $c$, are marked, as shown at G, the first twelve numerals, corresponding to the months of the year. A slide piece E can slide on the arm $e$ and has an opening through which any one of said numerals can appear.

In the key machine this stamp $k$ consists of a round dial with the twenty-six letters $o$ of the alphabet arranged in a certain manner on its under side around the outer edge (see Fig. 8). In individual machines the stamp k' is smaller than the stamp of the key machine and is marked with radial lines y, as shown in Fig. 9. In the individual machines the three lugs v are provided with needle points on their under sides which perforate the check when stamped, and in the key machine there are three blunted points w in similar positions.

A dial N (see Figs. 2 and 3) is made of any suitable metal and is revolved inside an outer dial F which is fixedly secured on the center of the face of the lower part of the machine. The outer dial or index plate F is divided and marked with the letters of the alphabet in a similar manner, and secured in the same relative position, as the outer dial or index plate f on the upper part of the machine. Like the dial f it also has a small groove at each division, the inner dial N being fitted with a small catch similar to the catch s on the inner dial h.

In the individual machine, as indicated in Fig. 12, there is no outer dial f but there is a dial similar in every respect to the inner dial h. This dial is permanently fixed to the wooden body or frame m of the machine, this position being fixed according to the initial letter of the owner's name.

The mode of operation is as follows:—

An individual having an account with the bank is furnished with an individual stamping machine in which the dial plate has been fixed in a certain position, a record of such position being kept by the bank.

On issuing a check, the check is first placed on the face of the lower part of the individual machine, and the upper part of the machine is then lowered upon it, thus securing it in place. The radiating arm c is then moved around to the required day of the month, the slide-piece E being shifted on the finger e, if necessary to correspond with a change in the month from that when last used, and is secured in that position by the spring-actuated bolt D entering one of the holes i in the perforated plate b; the check is then stamped by means of pressure applied to the knob a of the center-piece A, by which perforations are made thereon by the needle points and radial lines are marked therein corresponding to the radial lines y (Fig. 9). The check is then ready for use.

Upon presentation for payment the check is counter-stamped by the bank in the following manner:—The inner dial h on the key machine is revolved until it is in the same relative position as the individual machine which stamped the check, which position is determined by moving the catch s opposite to the initial letter of the name of the drawer of the check, these letters appearing on the dial f, and is secured in that position by means of the catch s. The inner dial N of the lower frame is also adjusted in the same manner. The check is then placed upon the dial N, so that the three points w penetrate the three perforations made by the needle points in the individual machine. This places the check in exactly the same position as when stamped by the individual machine. The radiating arm c is then adjusted, the slide piece E on the finger e being moved, if necessary, until the number of the month in which the check was dated appears through the aperture in said slide piece. The arm is then revolved until the aperture in the slide piece E is immediately over the required date of the month and is fixed in that position by means of the spring catch D. This places the center part of the key machine in the same position as the center-piece of the individual machine on that date. The check is then stamped and the resulting impression should, as shown in Fig. 10, register in a known manner with the impression made by the individual machine, or the check is not in order.

The arrangement of the letters and numbers on the different dials can be altered so as to provide a different code for each bank, or each bank can be supplied with several different codes since the number of codes is very great.

We claim:—

1. In a check protector, the combination of a dial having marked thereon twelve concentric series of numbers, each comprising fortuitously arranged the numbers one to thirty-one, a stamp rotatably located at the center of the series and means carried by the stamp for indicating the angular position of the stamp relative to the dial.

2. In a check protector, the combination of a dial having marked thereon twelve concentric series of numbers, each comprising fortuitously arranged the numbers one to thirty-one, a stamp rotatably located at the center of the series, and a radiating arm carried by said stamp and having marked thereon the numbers corresponding with the numbers of the series.

3. In a check protector, the combination of a dial having marked thereon twelve concentric series of numbers, each comprising fortuitously arranged the numbers one to thirty-one, a stamp rotatably located at the center of the series, a radiating arm carried by said stamp and having marked thereon the numbers corresponding with the numbers of the series, and an indicator movable longitudinally on said arm for distinguishing any one of said latter numbers.

4. In a check protector, the combination of a rotatable dial having marked thereon twelve concentric series of numbers, each comprising fortuitously arranged the numbers one to thirty-one, means around the dial for indicating different positions thereof, a stamp rotatably located at the center of the series and means carried by the stamp for indicating the angular position of the stamp relative to the dial.

5. In a check protector, the combination of a rotatable dial having marked thereon twelve concentric series of numbers, each comprising fortuitously arranged the numbers one to thirty-one, means around the dial for indicating different positions thereof, a stamp rotatably located at the center of the series, means carried by the stamp for indicating the angular position of the stamp relative to the dial, rotary means for supporting a check in position to be stamped by said stamp, and means for indicating different positions of the check.

6. In a check protector, the combination of a plate having marked thereon twelve series of numbers, each comprising fortuitously arranged the numbers one to thirty-one, a stamp movable in relation to the several series and also movable in the direction at right angles to the face of the stamp to produce an impression on a check, an arm movable with the stamp over the several series, and indicating means movable on the arm for indicating any desired one of a series.

7. In a check protector, a rotatable dial divided radially into thirty-one divisions and concentrically into twelve divisions, each concentric division having marked thereon along the several radial divisions the numerals one to thirty-one in fortuitous order, a series of stationary indicating marks around the dial, an arm rotatable concentrically with the dial and having marked thereon the numerals one to twelve in positions corresponding to the concentric divisions, a slide piece on said arm having an opening therethrough through which a numeral can be seen, a stamping device secured to said arm and having on the under side thereof means for producing an impression, and means for depressing said stamping device.

8. In a check protector, a rotatable dial divided radially into thirty-one divisions and concentrically into twelve divisions, each concentric division having marked thereon along the several radial divisions the numerals one to thirty-one in fortuitous order, a series of stationary indicating marks around the dial, an arm rotatable concentrically with the dial and having marked thereon the numerals one to twelve in positions corresponding to the concentric divisions, a slide piece on said arm having an opening therethrough through which a numeral can be seen, a stamping device secured to said arm and having on the under side thereof means for producing an impression, a rotatable check support beneath the stamp, a series of stationary indicators, corresponding with those of the first series, around the check support, and means for depressing said stamping device.

CHARLES F. MELLOR.
ALLEN G. HANSON.

Copies of this patent may be obtained for five cents each, by addressing the "Commissioner of Patents, Washington, D. C."